Feb. 20, 1934.　　　　E. F. HUDDLE　　　　1,947,552
MOWER
Filed June 12, 1933　　　2 Sheets-Sheet 1
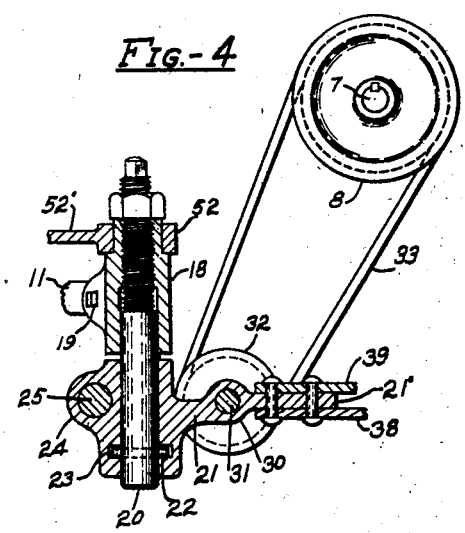
Fig.-4
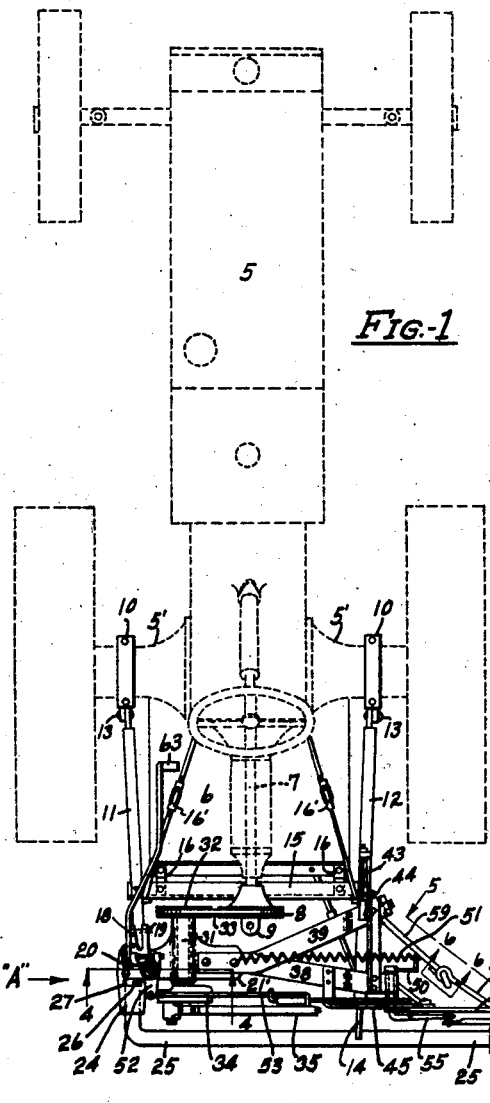
Fig.-1
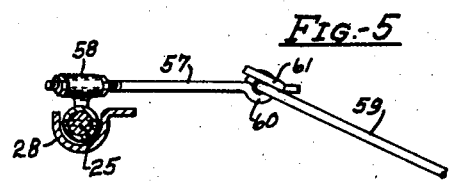
Fig.-5
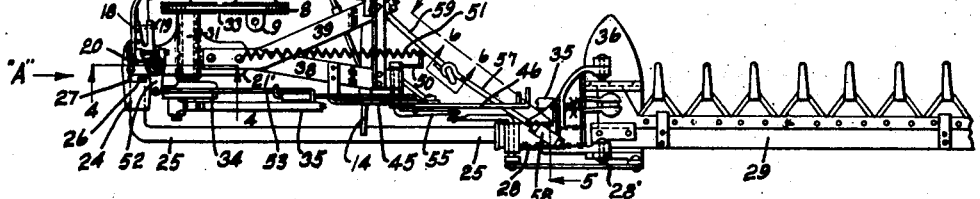
Fig.-6
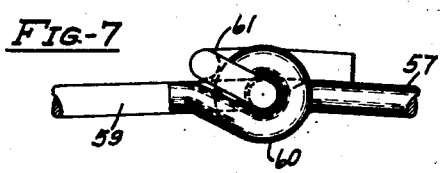
Fig.-7
INVENTOR.
EDWIN F. HUDDLE
BY James A. Walsh
ATTORNEY

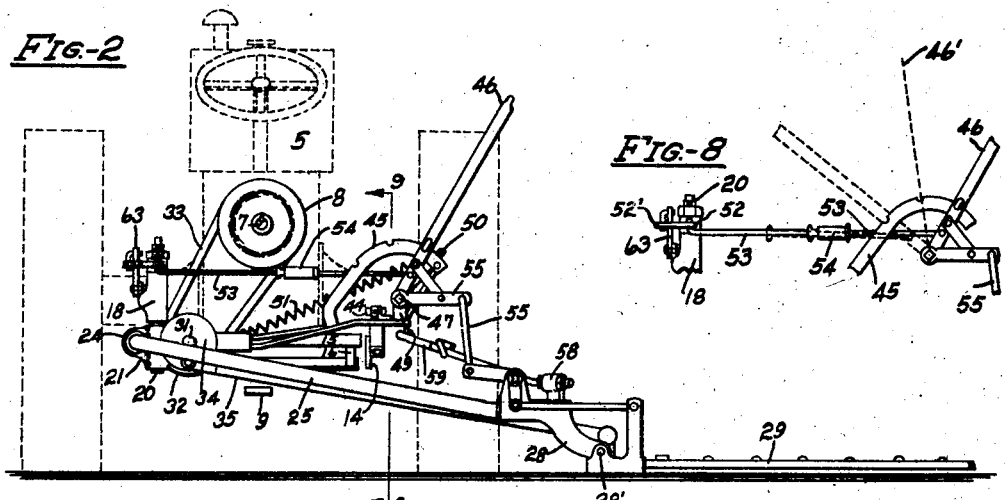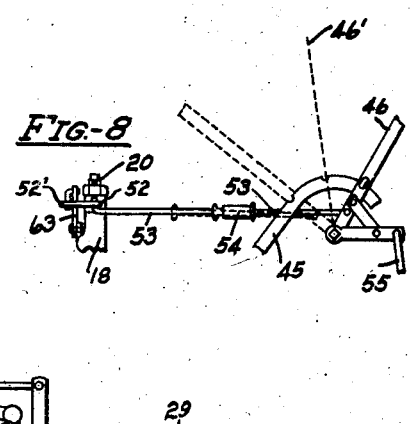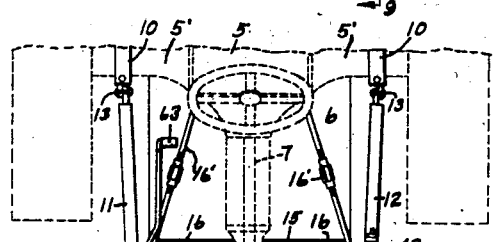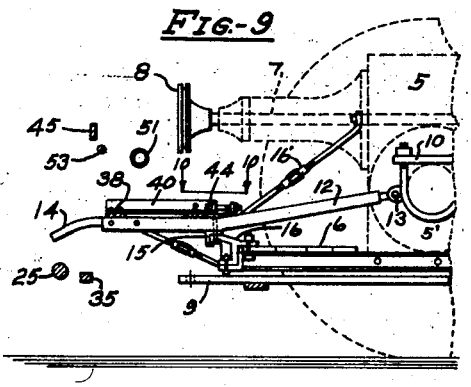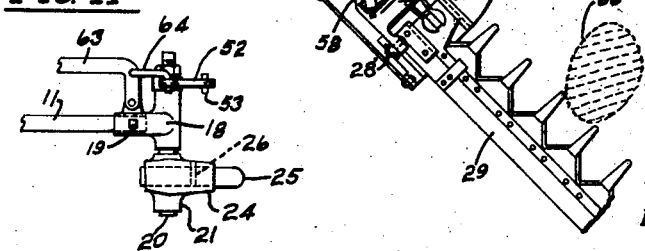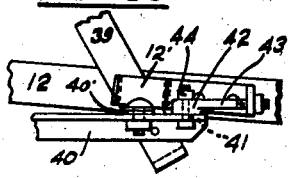

Patented Feb. 20, 1934

1,947,552

UNITED STATES PATENT OFFICE 1,947,552

MOWER

Edwin F. Huddle, Rockford, Ill., assignor to J. I. Case Company, Racine, Wis., a corporation Application June 12, 1933. Serial No. 675,355

20 Claims. (Cl. 56—25)

My invention relates to mowers adapted to be attached to and operated by tractors, and which are so constructed and arranged that the mower unit may be readily mounted on and detached from the tractor entirely independently of the tractor drawbar, and which when striking obstructions will be automatically released to swing rearwardly and at the same moment be rendered inoperative, and other advantages will be apparent from the following description.

In the accompanying drawings, forming part hereof, Figure 1 is a plan view of a tractor equipped with my improved mower; Fig. 2, a rear elevation; Fig. 3, a fragmentary plan view showing the relation of the mower to the tractor when meeting an obstruction; Fig. 4, a detail section taken on the dotted line 4—4 in Fig. 1; Fig. 5, a detail of the flexible tie-rod employed for bracing the mower parts, taken on the dotted line 5—5 in Fig. 1; Figs. 6 and 7 show details in plan and side elevation respectively of said tie-rod, taken on the dotted line 6—6 in Fig. 1; Fig. 8, a detail of the hand-lever and associated parts seen in Fig. 2; Fig. 9, a detail side elevation taken on the dotted line 9—9 in Fig. 2; Fig. 10, an enlarged detail view showing the mower securing and releasing means, taken on the dotted line 10—10 in Fig. 9; and Fig. 11 is a fragmentary side elevation taken in the direction of the arrow "A" in Fig. 1.

In the drawings the numeral 5 indicates a tractor embodying a platform 6 and a power take-off shaft 7 having a pulley 8 thereon, and a drawbar 9 connected to the tractor in any desired manner. In carrying out my invention, I may provide brackets 10 bolted or welded to the axle housings 5', and to which arms 11, 12, are connected by bolts 13 or otherwise, the arm 12 including a guide 14, Figs. 3 and 9, said arms being held in fixed relation by a cross-bar 15 which in turn is secured to the platform 6 by brackets 16 bolted to said bar and platform, and braced by adjustable rods 16', which arrangement enables accurate adjustment and alignment of the pulleys from the tractor axle.

Upon the end of arm 11 I secure a sleeve 18 by a bolt 19 in which sleeve an adjusting post 20 is threaded, and which post is turnably seated in a bracket 21 and held in position by a pin 22 adapted to travel in a groove 23, Fig. 4. Said bracket embodies a socket 24, Fig. 1, in which a push-rod 25 is rockingly secured by a pin 26 engaging the rod and passing through a slot 27 in the socket, said rod at its opposite end being hingedly fastened in a yoke 28 in a well-known manner, which in turn, at 28', is hingedly connected to a cutter-bar 29, as is common. Said bracket also embodies a bearing 30 in which a shaft 31 is mounted and provided with a pulley 32 at its forward end adapted to be connected by a belt 33, Fig. 2, to pulley 8, on the power shaft 7, for a purpose to appear, and on the rear end of shaft 31 a crank-wheel 34 is mounted to which a pitman 35 is connected, its opposite end being mounted on a shoe 36 and connected to the cutter-bar 29 of any desired construction and arrangement and in a well known manner. As indicated in Fig. 1, the post 20 is positioned rearwardly of the aligned pulleys so that as the mower is swung rearwardly the pulleys come close together whereby tension on belt 33 is relieved. Bracket 21, as indicated in Fig. 4, has an extension 21', to the under and upper sides of which brace members 38, 39, respectively, are secured and which are preferably in divergent relation, as indicated in Figs. 1 and 3, and braced by an angle-iron spacer 40 adapted to slide over the guide 14 on the arm 12 as the mower is swung about its pivotal connection 20, said bracket and brace members constituting a supplemental frame for supporting the mower equipment. When the mower is in operative position, indicated in Figs. 1, 2, 9 and 10, a hole 41 in spacer 40 registers with an eye 42 in a stay-bolt 43 secured to arm 12, Fig. 10, so that a bolt 44 may be inserted through said spacer 40 and eye 41 and the mower thus held in fixed cutting position until striking an obstruction, when the bolt becomes severed to permit the mower to swing rearwardly into the position shown in Fig. 3. It will, therefore, be understood that bracket 21, socket 24, shaft bearing 30 and extension 21' comprise an integral structure by which I am enabled to connect thereto the parts described in a simple and accurate manner.

On the inner side of angle iron spacer 40, I attach shims 40', Fig. 10, which are located so as to be trapped between the bracket 12' and said spacer for the purpose of compensating for slight inaccuracies that might be made in the width of the frame during the process of manufacturing.

A notched quadrant 45 is secured to the brace member 38 for engaging a hand bar 46 fastened to a shaft 47 operating in a bearing 49 secured to said brace, the said shaft having a crank 50 to which a tension spring 51 is connected, its opposite end being secured to the bracket 21. The lever 46 is connected to a gell crank 52 on the sleeve 18 by means of an extensible linkage comprising the rods 53 connected by a tubular spacer 54 so that when the lever 46 is manipulated to vertically adjust the cutter-bar 29 through the toggle 55, Fig. 2, in a well known manner, the sections of linkage 53 will slide in relation to each other to thus assure free movement of the lever in reverse directions as desired without affecting the foot lever 63. In order to effectively brace the push-rod 25 to the supplemental frame member 39 I employ a flexible tie-rod, Figs. 1 and 3, section 57 of which is secured in a holder 58 fixedly fastened to push-rod 25 as shown in Fig. 5, section 59 being pivotally connected to said member 39, the meeting ends of said rod sections being yieldingly knotted at 60, 61, Figs. 6 and 7, to constitute a hinge whereby when the mower structure is raised the section 57 remains rigid and moves vertically with the push-rod 25 while the section 59 being pivotally fastened on member 39 hinges about this point permitting the knot to break as shown in Fig. 5. The peculiar connection of the sections comprising the semi-rigid tie-rod is such that they will move upwardly from horizontal but not downwardly, that is, the rod will be flexible in its upward and outward movement and become rigid when moved downwardly and inwardly. I also provide the foot lever 63 for raising the mower vertically, which is adapted to engage arm 52' of bell crank 52 through a link 64 for turning the bell crank on the sleeve 18 and operating the hand-lever 46 through links 53. In operating the foot lever 63 it will be understood that the hand-lever 46 will first be disengaged from quadrant 45 so that free movement of said lever by the linkage 53 will be permitted, which movement is limited to a predetermined distance as indicated at 46' in Fig. 8.

The hand lever is used for controlling the vertical movement of the cutter-bar 29 when it is desired to raise it the maximum distance while for minor adjustments the hand or foot lever may be used, each independently of the other or simultaneously if so desired. It will be also understood that the toggle 55, as well as other detail actuating mechanisms not specifically described, are of well known character and operation designed to raise cutter bar 29 to a predetermined height by manipulation of either the foot or hand-lever and that further operation of these elements will vertically swing the push-rod 25 and the parts associated therewith together with the cutter bar to further heights as desired.

In assembling the arms 11, 12, with the tractor axle housing and its platform 6 in the manner described, I provide a rigid and durable support for the mower, and when in operative position, Fig. 1, the pivotal end 20 of the mower and its frame part 38, 39, 40, engaging the arm 12 and locked by the bolt 44, are in well balanced relation so that the driving pulley 8 on the tractor will be in accurate line with the pulley 32, Fig. 1, for mounting thereon the belt 33 for actuating the mower through the power shaft 7. However, should said belt become slack it can be readily taken up by adjusting post 20 threaded in sleeve 18, which is accomplished by applying an implement to the upper squared end of the post and rotating it in the direction to urge it downwardly, which movement of the post carries the bracket 21 and pulley 32 downwardly a sufficient distance to tighten said belt 33. When in the operative position shown in Fig. 1, it will be apparent that power is transmitted from shaft 7 through the pulleys 8, 32, and belt 33 to shaft 31, the crank wheel 34 on said shaft to which the pitman 35 is attached actuating the latter to reciprocate the cutter-bar 29 in a common and well known manner. Should the cutter-bar strike an obstruction, as a stump 66, Fig. 3, such contact will cause bolt 44 to break, and the mower as a whole will swing rearwardly on the pivot post 20 sufficiently to clear the object struck, or the mower, by manipulating the levers 46 and 63, may be raised to pass over the obstruction, and upon such occurrence the mower may be manually swung forwardly so that spacer 40 and associated parts will move over the guide 14, Fig. 9, and be normally positioned on arm 12 to be secured thereon by another bolt 44 and the mower thus readily placed in proper operative position to continue its work. It will be understood, of course, that when the mower is swung rearwardly the alignment of pulley 32 in relation to pulley 8 becomes destroyed and the belt 33 displaced, but upon return of the mower to operative position as described, so that the pulleys will again be in alignment, the belt 33 may be quickly applied thereto. When desiring to remove the mower equipment to employ the tractor for other uses, it is but necessary to detach the arms 11, 12, from the axle housing 5' and the platform 6, when the structure in entirety may be detached, or if it becomes preferable to remove the mower in part then it is but necessary to detach arm 11 from sleeve 18 by removing the bolts 44 and then 19 when the bracket 21, brace members 38, 39, and parts associated therewith may be removed as a unitary structure.

I claim as my invention:

1. The combination, with a tractor having a platform and a drawbar, of a main frame having arms connected to the platform independently of the drawbar, a support connected to the free end of one of the arms, a pivot post in the support adapted to be vertically adjusted therein, a supplemental frame carrying mowing mechanisms mounted on said post and adapted to be vertically adjusted thereby, and means on the opposite arm of the main frame for normally holding the mower laterally in mowing position and also whereby when striking obstructions the mower frame and parts associated therewith will be released to swing rearwardly in relation to the tractor and independently of its drawbar.

2. The combination, with a tractor having a platform, a drawbar and a power shaft, of a main frame connected to the platform independently of the drawbar, a mower including a frame pivotally connected at one point to the main frame independently of the drawbar, a shaft in the mower frame belted to the power shaft for actuating the mowing mechanisms associated with said frame, and means supported on the main frame for normally holding the mower laterally in cutting position and also whereby when striking obstructions the mower frame and parts associated therewith will be released to swing rearwardly of the tractor and disconnect said shaft and power shaft.

3. The combination, with a tractor having a platform and a drawbar, of a main frame supported by the platform independently of the drawbar, a mower frame embodying a support including a socket member, a shaft bearing and means for securing a brace thereto, a post upon which said support is pivotally mounted, and means for securing the post to the frame.

4. The combination, with a tractor having axles, a platform and a drawbar, oppositely disposed frame members secured to the axles and to the platform independently of the drawbar, a support connected to the free end of one of the members, a mower frame pivotally connected to the support independently of the drawbar, and means on the opposite frame member for maintaining the mower frame laterally in cutting position and also whereby when striking obstructions the mower frame and parts associated therewith will be released to swing rearwardly in relation to the tractor.

5. In a mower, a main frame adapted to be connected to a tractor embodying a power shaft having a pulley thereon, a support connected to said frame, a pivot-post adjustably connected to the support, a mower frame pivotally mounted on the post and carrying a pulley adapted to be connected to and driven by the power shaft pulley, a push-rod pivotally connected to the mower frame, a cutter-bar connected to the push-rod, means on the mower frame for adjusting the cutter-bar, and means on the main frame for normally holding the mower laterally in cutting position and also whereby when striking obstructions the mower frame will be released to swing rearwardly of the tractor on its pivotal connection.

6. In a mower, a main frame including rearwardly extending arms adapted to be connected to a tractor platform, a mower frame including a cutter-bar pivotally connected to the free end of one of the arms, means for drivingly connecting the mower to the tractor, means on the opposite arm for guiding the mower frame in its swinging movements, and fastening means on the latter arm for holding the mower laterally in relation to the tractor and also whereby when striking obstructions the mower frame and parts associated therewith will be released to swing rearwardly in relation to the tractor.

7. The combination, with a tractor including a power take-off shaft having a pulley thereon, of a mower frame pivotally connected to the tractor and including a driven shaft having a pulley thereon in alignment with the tractor pulley when the mower is in operative position, a belt connecting said pulleys, and releasable means connecting the mower frame to the tractor whereby when said frame is released from the tractor and swung rearwardly on its pivot said belt will be displaced from the pulleys and the mower rendered inoperative.

8. In a tractor-drawn mower, a frame comprising a plurality of members, means for securing the frame to the tractor platform, a bracket, means for pivotally securing the bracket to one of the frame members, means for securing a push-rod to the bracket, a bearing associated with the bracket, a shaft in the bearing having a pulley at its forward end, a pitman connected to the rear end of said shaft, a cutter-bar forming part of the mower, means connecting the pitman to the cutter-bar for actuating the latter, means connecting the push-rod to the cutter-bar for sustaining the latter, means for connecting the mower in operative position to one of said frame members, and means connected to a tractor power shaft and to said pulley for rotating the latter to actuate said pitman and cutter-bar.

9. In a tractor-drawn mower having a frame comprising rearwardly extending arms, means for securing the frame to a tractor platform, means for pivotally connecting the mower to the free end of one of the frame arms whereby the mower will swing rearwardly and forwardly in relation to the tractor, means associated with the opposite frame arm for guiding the mower when being adjusted into operative position in relation to the tractor, and means for securing the mower to the last mentioned frame arm when in operative position and releasing the mower therefrom to swing rearwardly when meeting obstructions.

10. In a tractor-drawn mower having a frame comprising a short and a long arm positioned adjacent a tractor body and a cross-member connecting said arms, means for connecting said frame to the tractor platform, a bracket pivotally connected to the short arm, mower mechanism supported by the bracket, a supplemental frame on the bracket extending oppositely from its pivotal connection, and means on said latter frame adapted to move along said long arm when the mower structure is swung rearwardly and forwardly in relation to a tractor.

11. In a mower comprising a frame adapted to be connected to a tractor platform, a bracket embodying a push-rod socket and a shaft bearing, an adjusting post in the bracket, a sleeve on the post, means for securing the sleeve to the frame, a shaft in the bracket-bearing having a pulley on its forward side and a crank on its rear side, a cutter-bar, a push-rod in said socket and connected to the cutter-bar for vertically adjusting the latter, a pitman secured to the crank and to the cutter-bar for actuating the latter, a supplemental frame secured to the bracket, a lever on said latter frame, a toggle connecting the lever and cutter-bar whereby the latter may be adjusted by manipulating said lever, and means connecting the pulley to the power shaft of a tractor for actuating the pitman and cutter-bar.

12. In a mower, a frame comprising arms adapted to be connected to a tractor axle, a cross-member connecting said arms to a tractor platform, a supplemental frame pivotally connected to one of said arms to swing in relation to a tractor, cutting mechanism supported by the supplemental frame, and means on the opposite arm for securing the supplemental frame in an operative position in relation to a tractor and for releasing the supplemental frame to swing rearwardly of the tractor when the cutting mechanisms meet obstructions.

13. In a mower, a frame adapted to be connected to a tractor having a power shaft and pulley thereon, a bracket having a shaft bearing, a shaft in said bearing and having a pulley at its forward end normally in alignment with said tractor pulley, a belt connecting said pulleys, a mower connected to the bracket, and means for pivotally connecting the bracket to said frame whereby the mower will swing rearwardly when obstructed and throw said pulleys out of alignment to automatically release said belt to prevent operation of the mower.

14. In a mower, a frame comprising rearwardly-extending members adapted to be connected to a tractor platform, a supplemental frame comprising a bracket and brace members adapted to be connected to the free end of one of said frame members for supporting mowing mechanisms, supporting means connected to said supplemental frame, pivotal means connecting the bracket and supporting means whereby the supplemental frame and parts associated therewith may swing in reverse directions in relation to the tractor, and means on the opposite frame member for normally maintaining the supplemental frame and mowing mechanisms in operative position in relation to the tractor and for releasing said supplemental frame whereby the same will swing rearwardly from the tractor and the mowing mechanisms carried thereby rendered inoperative.

15. In a mower, a main frame comprising rearwardly extending members adapted to be connected to a tractor platform, a supplemental frame comprising a bracket and brace members adapted to be connected to the free end of one of said frame members for supporting mowing mechanisms, said bracket embodying a shaft bearing, a shaft in said bearing, mowing mechanisms associated with the shaft, means drivingly connecting the shaft to a tractor for actuating said mechanisms, supporting means connected to said main frame, and pivotal means connecting the bracket and supporting means whereby said supplemental frame and parts associated therewith may swing in reverse directions in relation to a tractor.

16. In a mower comprising a frame adapted to be connected to a tractor platform, pivotal means connecting the frame to the platform, a push-rod pivotally connected to said pivotal means, a cutter-bar hingedly secured to the push-rod and a flexible tie-rod connecting the push-rod and frame said rod comprising a thrust member fixedly secured to the push-rod and a member yieldingly connecting the thrust member and pivotally connected to the mower frame whereby when the push-rod is raised the yielding member will hinge on the thrust member to follow the movement of the push-rod.

17. In a mower comprising a frame adapted to be connected to a tractor platform, pivotal means connecting the frame to a tractor, a push-rod connected to said pivotal means, and a tie-rod connecting the push-rod and frame said tie-rod comprising a thrust member fixedly secured to the push-rod and a member yieldingly knotted to the thrust member and pivoted to the frame to follow movements of the push-rod when vertically adjusted.

18. The combination, with a support, of a mower frame pivotally mounted thereon, a push-rod forming part of the frame, a bell-crank on said pivotal mounting, a hand-lever on the frame for vertically adjusting the push-rod, an extensible and retractible linkage connecting the lever and the bell-crank whereby the lever may be adjusted a predetermined distance, and a foot lever also connected to the bell-crank and adapted to vertically adjust the push-rod, said hand lever and foot lever being independently or simultaneously operable.

19. In a mower, a main frame adapted to be connected to a tractor, a supplemental frame pivotally mounted on the main frame said supplemental frame having a spacer thereon adapted to slide on the main frame, and means insertible between the spacer and a main frame part for adjusting the supplemental frame.

20. The combination, with a tractor including a power take-off shaft having a pulley thereon, of a mower frame pivotally connected to the tractor and including a driven shaft having a pulley thereon, a belt connecting said pulleys when the mower is in operative position for actuating the latter, and means connecting the mower frame to the tractor for releasing said frame to swing rearwardly and displace the belt from the pulleys to render the mower cutting mechanisms inoperative.

EDWIN F. HUDDLE.